(12) United States Patent
Higuchi et al.

(10) Patent No.: US 7,606,646 B2
(45) Date of Patent: *Oct. 20, 2009

(54) PASSIVE SAFETY SYSTEM AND DETERMINATION DEVICE

(75) Inventors: Hiroshi Higuchi, Kariya (JP); Seiya Ide, Okazaki (JP)

(73) Assignee: DENSO CORPORATION, Kariya (JP)

(*) Notice: Subject to any disclaimer, the term of this patent is extended or adjusted under 35 U.S.C. 154(b) by 43 days.

This patent is subject to a terminal disclaimer.

(21) Appl. No.: 11/016,898

(22) Filed: Dec. 21, 2004

(65) Prior Publication Data

US 2005/0165530 A1 Jul. 28, 2005

(30) Foreign Application Priority Data

Jan. 28, 2004 (JP) ............................. 2004-020533

(51) Int. Cl.
*B60R 21/01* (2006.01)
(52) U.S. Cl. .................. 701/45; 280/735; 340/436; 180/282
(58) Field of Classification Search ............... 701/37
See application file for complete search history.

(56) References Cited

U.S. PATENT DOCUMENTS

| | | | | |
|---|---|---|---|---|
| 5,068,793 A | * | 11/1991 | Condne et al. ............... 701/46 |
| 5,206,469 A | * | 4/1993 | Takeda et al. ......... 200/61.45 M |
| 5,402,343 A | * | 3/1995 | Shibata et al. ............... 701/46 |
| 5,431,441 A | * | 7/1995 | Okano ........................ 280/735 |
| 5,436,838 A | * | 7/1995 | Miyamori .................... 701/46 |
| 5,580,084 A | | 12/1996 | Gioutsos ..................... 280/735 |
| 5,608,629 A | * | 3/1997 | Cuddihy et al. ................ 701/1 |
| 5,777,225 A | * | 7/1998 | Sada et al. .................... 73/488 |
| 5,779,264 A | | 7/1998 | De Mersseman et al. .... 280/735 |
| 5,904,730 A | | 5/1999 | Yamazaki et al. .......... 701/301 |
| 5,978,722 A | * | 11/1999 | Takasuka et al. ............. 701/45 |
| 6,167,335 A | | 12/2000 | Ide et al. ...................... 701/45 |
| 6,236,922 B1 | * | 5/2001 | Andres ........................ 701/45 |
| 6,272,412 B1 | * | 8/2001 | Wu et al. ..................... 701/47 |
| 6,459,366 B1 | * | 10/2002 | Foo et al. ................... 340/436 |
| 6,644,688 B1 | * | 11/2003 | Hu et al. .................... 280/735 |

(Continued)

FOREIGN PATENT DOCUMENTS

EP    1 000 820 A3    12/2000

(Continued)

OTHER PUBLICATIONS

A Canadian Office Action dated Jul. 10, 2007 in corresponding Canadian application No. 2,493,169.

(Continued)

*Primary Examiner*—Tuan C To
(74) *Attorney, Agent, or Firm*—Posz Law Group, PLC (57) ABSTRACT

A determination device includes a single acceleration sensor that measures an acceleration of a vehicle and a determination circuit that is electrically connected with the acceleration sensor. The determination circuit has a plastic deformation pulse detection section and a severity determination section. The plastic deformation pulse detection section detects a plastic deformation pulse by separating the plastic deformation pulse from an acceleration waveform produced by the acceleration sensor. The severity determination section determines severity of a collision in a vehicle accident based on the detected plastic deformation pulse. A passive safety device is operated according to the determined severity.

11 Claims, 11 Drawing Sheets

U.S. PATENT DOCUMENTS

| | | | |
|---|---|---|---|
| 6,721,642 B1 * | 4/2004 | Wu et al. | 701/45 |
| 2001/0043011 A1 * | 11/2001 | Ugusa et al. | 307/10.1 |
| 2002/0183962 A1 * | 12/2002 | Glaser et al. | 702/151 |
| 2003/0150283 A1 * | 8/2003 | Stanley et al. | 73/862.391 |
| 2004/0069067 A1 * | 4/2004 | Mancinone et al. | 73/653 |
| 2004/0102882 A1 * | 5/2004 | Sala et al. | 701/45 |

FOREIGN PATENT DOCUMENTS

| | | | |
|---|---|---|---|
| GB | 2 340 978 | | 3/2000 |
| JP | 05034367 A | * | 2/1993 |
| JP | A-09-150709 | | 6/1997 |
| JP | A-2002-019570 | | 1/2002 |

OTHER PUBLICATIONS

Pending U.S. Appl. No. 11/016,893, (Corresponds to GB 2410595), not yet published, Higuchi et al.

Examination Report from Great Britain Patent Office issued on Apr. 13, 2006 for the corresponding Great Britain patent application No. GB0500488.2.

Office Action dated Mar. 17, 2008 in corresponding Japanese Patent Application No. 2004-020533 (and English translation).

* cited by examiner

PASSIVE SAFETY SYSTEM AND DETERMINATION DEVICE

CROSS REFERENCE TO RELATED APPLICATION

This application is based on and incorporates herein by reference Japanese Patent Application No. 2004-20533 filed on Jan. 28, 2004.

FIELD OF THE INVENTION

The present invention relates to a passive safety system for protecting an occupant of a vehicle against injury or reducing the severity of injuries in the event of an accident, and a determination device included in the passive safety system.

BACKGROUND OF THE INVENTION

A determination device for a passive safety system is proposed in JP-A-11-194137. In the passive safety system, an airbag is inflated in two steps using a satellite sensor and a floor G sensor. The satellite sensor is disposed at the front part of a vehicle and the floor G sensor is disposed in an electronic control unit ECU that is located under the instrument panel above the floor tunnel. The airbag system includes two inflators. The determination device detects the difference in phase between two acceleration waveforms obtained from the satellite sensor and the floor G sensor. Then, the determination device determines the severity of collision based on the detected phase difference. Both of two inflators in the airbag system are actuated if the severity is high, that is, the accident is serious. The airbag is inflated at a high pressure when both inflators are actuated and therefore an impact of the collision on the occupant is reduced.

The occupants may receive excessive impact from the airbag inflated at the high pressure if the severity is low, that is, the accident is not serious. When the severity is determined as low, only one of the two inflators is actuated to inflate the airbag at a low pressure. As a result, the impact of the airbag on the occupant is reduced.

However, the determination device of the proposed passive safety system requires two kinds of sensors: a satellite sensor and a floor G sensor. If a malfunction occurs in one of the sensors, the severity may not be properly determined.

SUMMARY OF THE INVENTION

The present invention therefore has an objective to provide a passive safety system having a determination device that determines the severity of collision based on an acceleration waveform produced by a single acceleration sensor. The determination device produces information necessary for driving a passive safety device according to the severity of collision.

The determination device includes a single acceleration sensor and a determination circuit. The acceleration sensor measures an acceleration of a vehicle. The determination circuit has a plastic deformation pulse detection circuit and a severity determination circuit. The plastic deformation pulse detection circuit is electrically connected with the acceleration sensor. The plastic deformation pulse detection circuit detects a plastic deformation pulse from an acceleration waveform obtained through the acceleration measurement. The severity determination circuit determines the severity of collision based on the plastic deformation pulse. With this configuration, only one sensor is required. Thus, the severity determination is reliably performed.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

First Embodiment

Severity of a collision in an accident becomes higher as a speed of a vehicle increase and the severity becomes lower as the speed of the vehicle decrease. Namely, the severity of a collision can be determined based on an acceleration waveform produced by an acceleration sensor.

Figure 1:
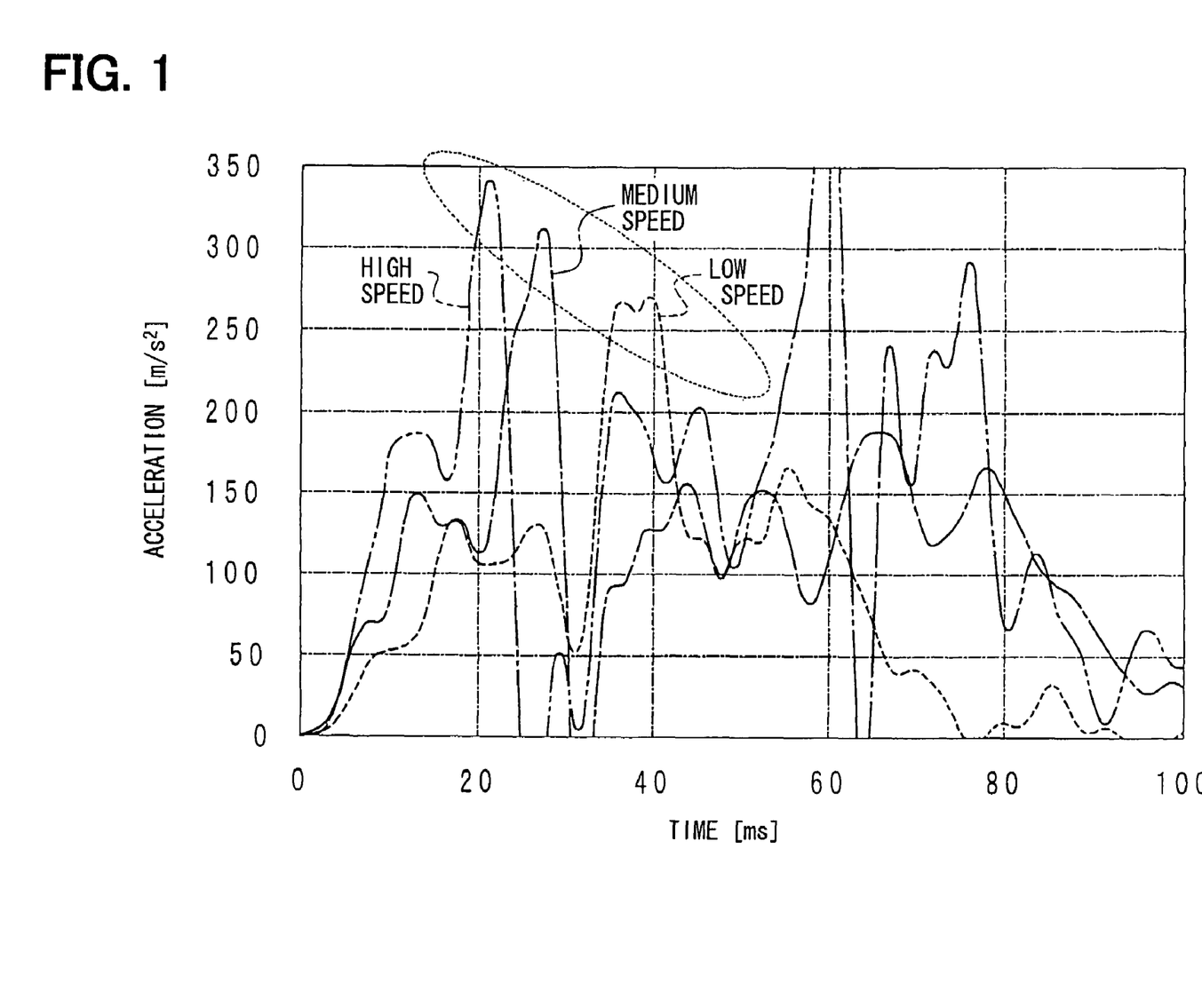
FIG. 1 is a graph showing acceleration waveforms according to the first embodiment of the present invention.

Examples of high speed (30-35 mph), medium speed (20-23 mph), and low seed (under 16 mph) acceleration waveforms are shown in FIG. 1. A peak that indicates a structural characteristic of a vehicle appears in each waveform as indicated with a dashed-line circle. The peak becomes higher as the vehicle speed increases, that is, the peak of the medium speed waveform is higher than that of the low speed waveform and the peak of the high speed waveform is higher than that of the medium speed waveform. Therefore, a level of the speed, namely, the severity can be determined based on the height of the peaks.

However, the acceleration waveforms produced at a vehicle collision are different from vehicle to vehicle even among the same model of vehicles. The severity determination is usually performed in consideration of such variations. For example, a variation of ±10% is taken into consideration for determining the severity based on the acceleration waveform. The passive safety device is operated at a low severity level when the vehicle speed is relatively low. In the case of an airbag system, an airbag is inflated at a low pressure when the vehicle speed is low.

More specifically, only one inflator is actuated to inflate the airbag at low pressure. Another inflator is actuated when a certain period has elapsed so that an occupant will not have an excessive impact from the airbag. A safety margin of 10% is provided against the acceleration waveform and the acceleration waveform having 110% of the measured acceleration waveform amplitudes is used in the severity determination. Therefore, the passive safety device is properly operated.

The passive safety device is operated at a high severity level when the vehicle speed is relatively high. When the speed of the vehicle is the medium speed or higher, the both inflators are simultaneously actuated to inflate the airbag at a high pressure. A safety margin of 10% is provided against the acceleration waveform and the acceleration waveform having 90% of the measured acceleration waveform amplitudes is used in the severity determination. Therefore, the passive safety device is properly operated.

Figure 2:
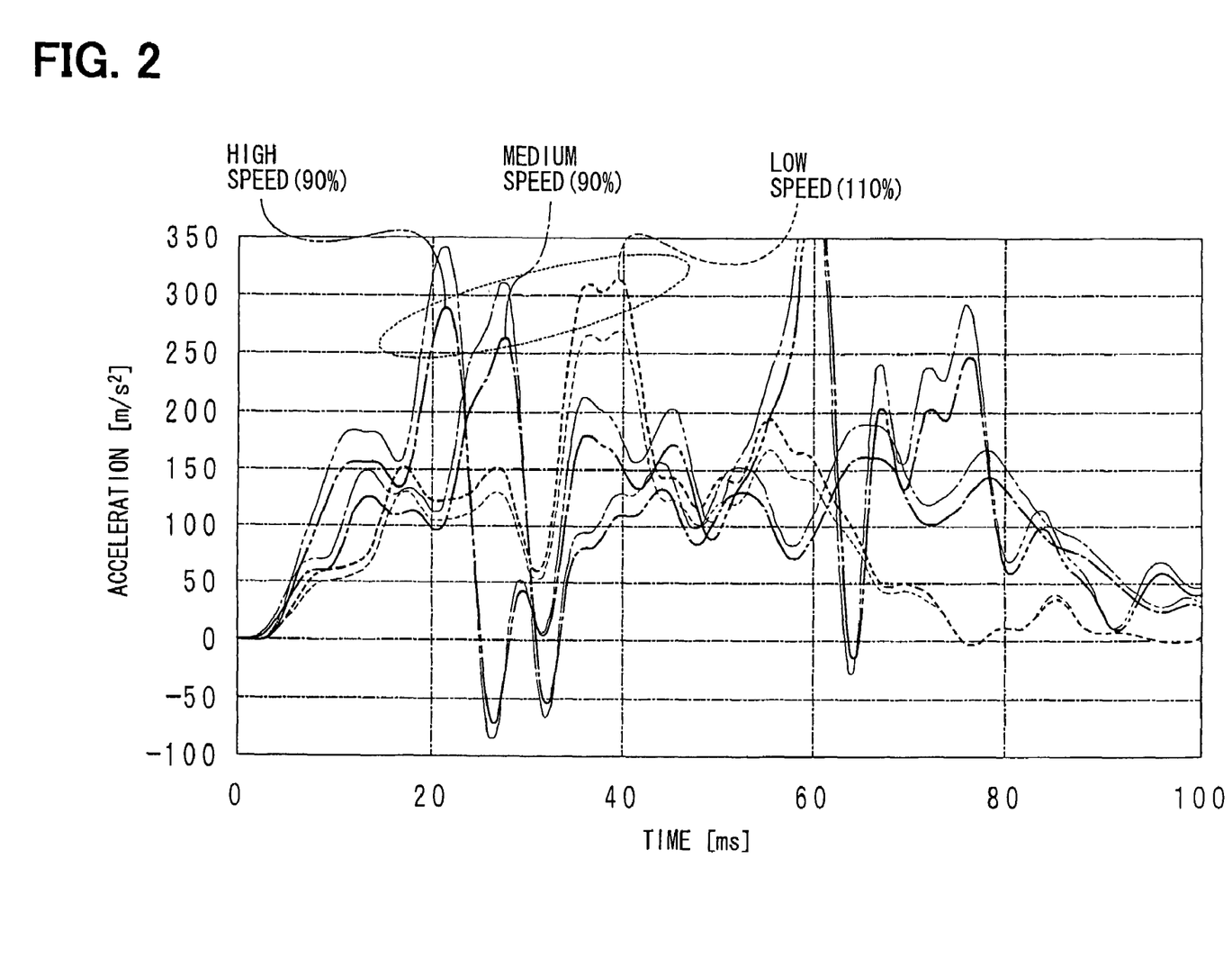
FIG. 2 is a graph showing the acceleration waveforms with 10% safety margins according to the first embodiment.

The high speed and the medium speed acceleration waveforms having 90% of the measured acceleration waveform amplitude and the low speed acceleration waveform having 110% of the measured acceleration waveform amplitude are shown in FIG. 2. The corresponding measured waveforms shown in FIG. 1 are also include in FIG. 2 and indicated fine lines. The X axis is a time scale and the Y axis is an acceleration, or deceleration, scale. A peak indicated with a dashed-line circle appears in each waveform. The peak of the medium speed waveform (90% amplitude waveform) is higher than that of the high speed waveform (90% amplitude waveform). The peak of the high speed waveform (90% amplitude waveform) is higher than that of the medium speed waveform (90% amplitude waveform). The levels of the peaks are not proportional to the vehicle speeds when the variations are taken into consideration.

It is assumed that the acceleration waveform contains an elastic deformation pulse related to damage to the entire vehicle and a plastic deformation pulse related to damage to individual parts of the vehicle. Based on this assumption, the severity can be accurately determined based on the plastic deformation pulse. Thus, the plastic deformation pulse is separated from the acceleration waveform.

Figure 3:
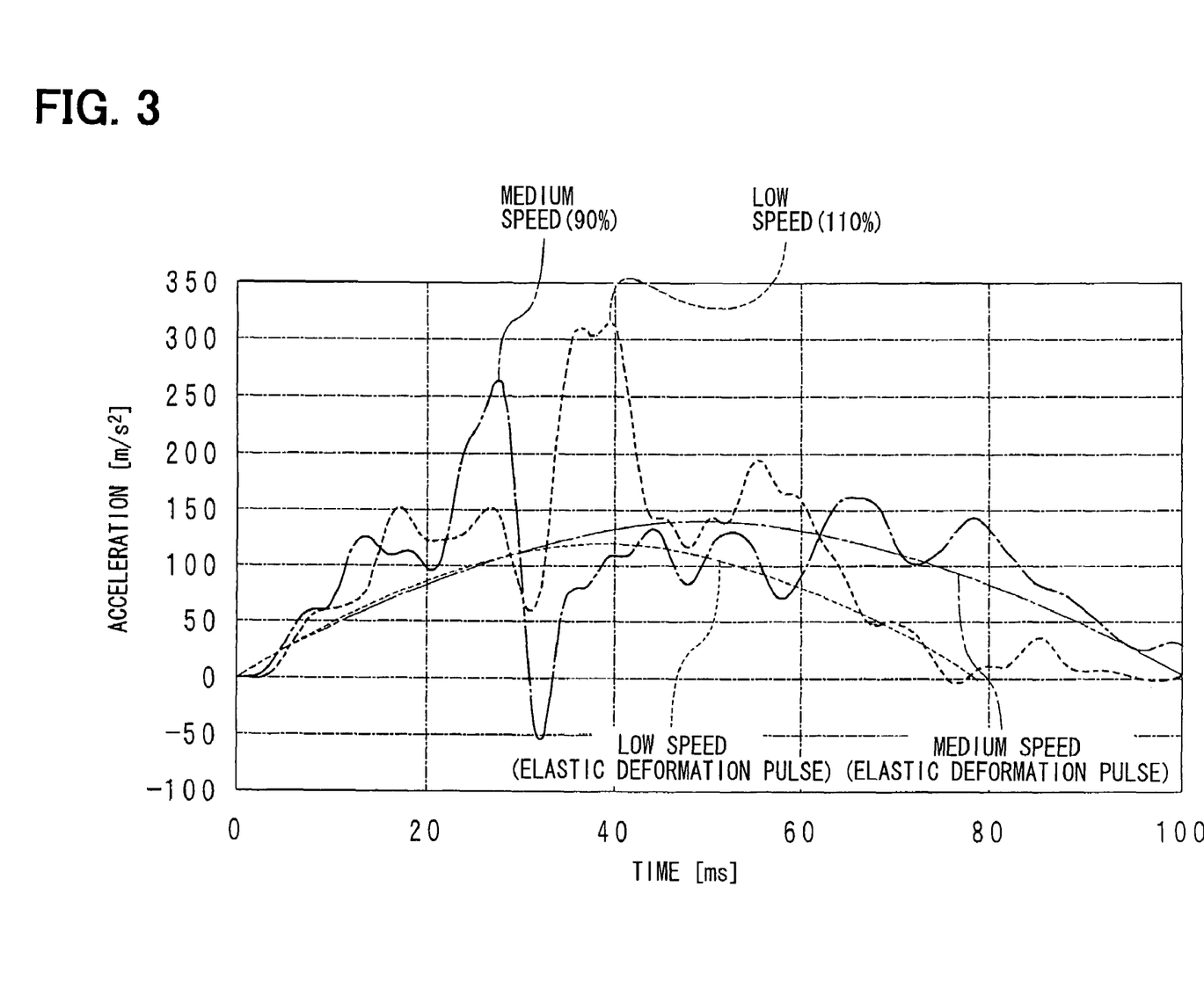
FIG. 3 is a graph showing the acceleration waveforms with 10% safety margins and elastic deformation pulses according to the first embodiment.
Figure 4A:
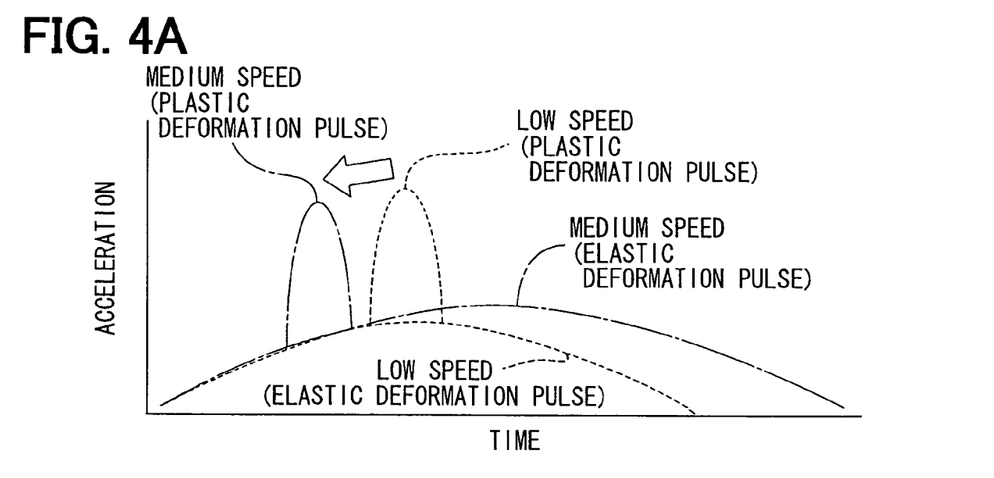
FIG. 4A is a schematic diagram of the acceleration waveforms shown in FIG. 3 according to the first embodiment.

The medium speed acceleration waveform, the low speed acceleration waveform, the elastic deformation pulse, and the plastic deformation pulse are shown in FIG. 3. The elastic deformation pulse is a long-period, low-frequency pulse, a half period of which is equal to the whole period of a collision. The elastic deformation pulses and the plastic deformation pulses contained in the low speed and the medium speed acceleration waveforms are schematically illustrated in FIG. 4A. Each of the low speed acceleration waveform and medium speed acceleration waveform contain the elastic deformation pulse and the plastic deformation pulse. The peak of the low speed acceleration waveform is higher than the medium speed acceleration waveform, namely, the levels of the peaks (elastic deformation pulse+plastic deformation pulse) are not proportional to the vehicle speed.

Figure 4B:
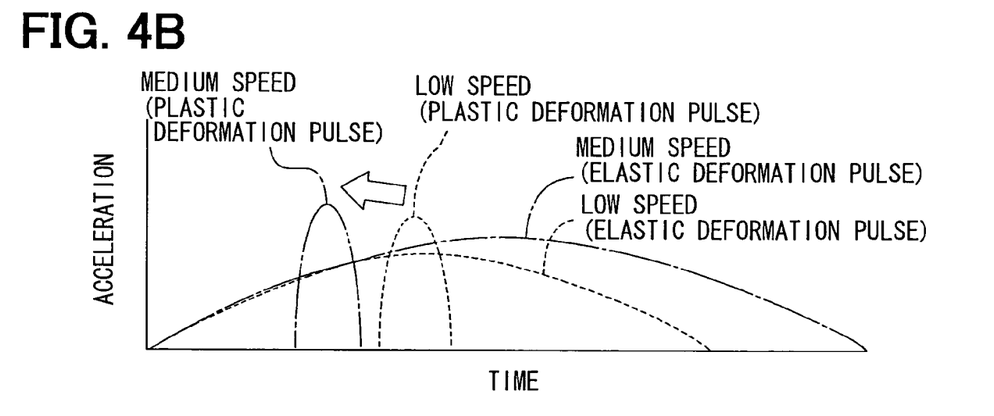
FIG. 4B is a schematic diagram of the elastic deformation pulses and plastic deformation pulsed contained in the acceleration waveforms shown in FIG. 4A according to the first embodiment.

The plastic deformation pulse is separated from the acceleration waveform. The plastic deformation pulses of the low speed acceleration waveform and the medium speed acceleration waveform are evaluated with the same reference level. As a result, the peak of the medium speed acceleration waveform becomes higher than that of the low speed acceleration waveform as shown in FIG. 4B. Namely, the levels of the peaks become proportional to the vehicle speed.

Figure 5:
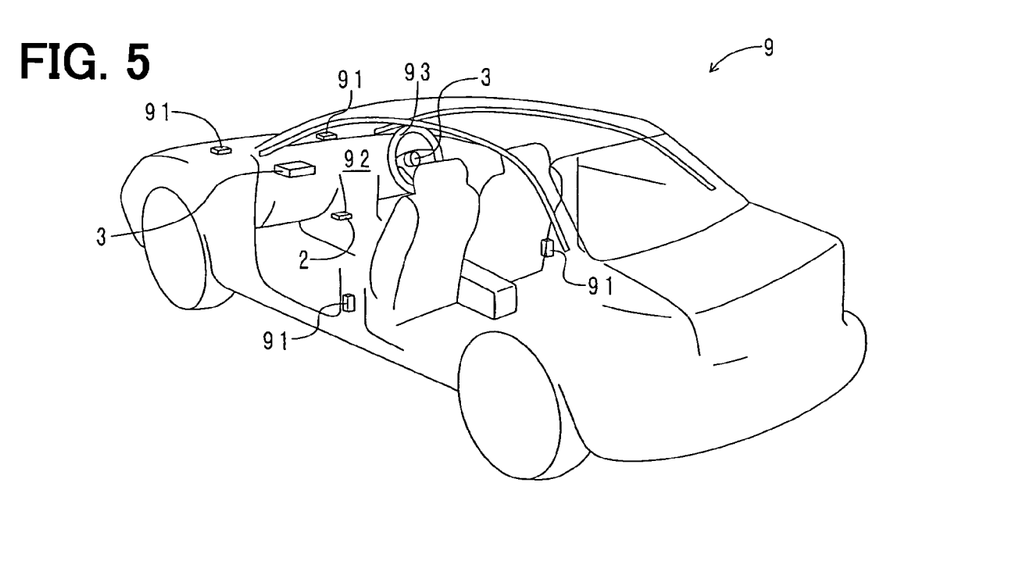
FIG. 5 is a perspective view of a vehicle with a passive safety system according to the first embodiment.
Figure 6:
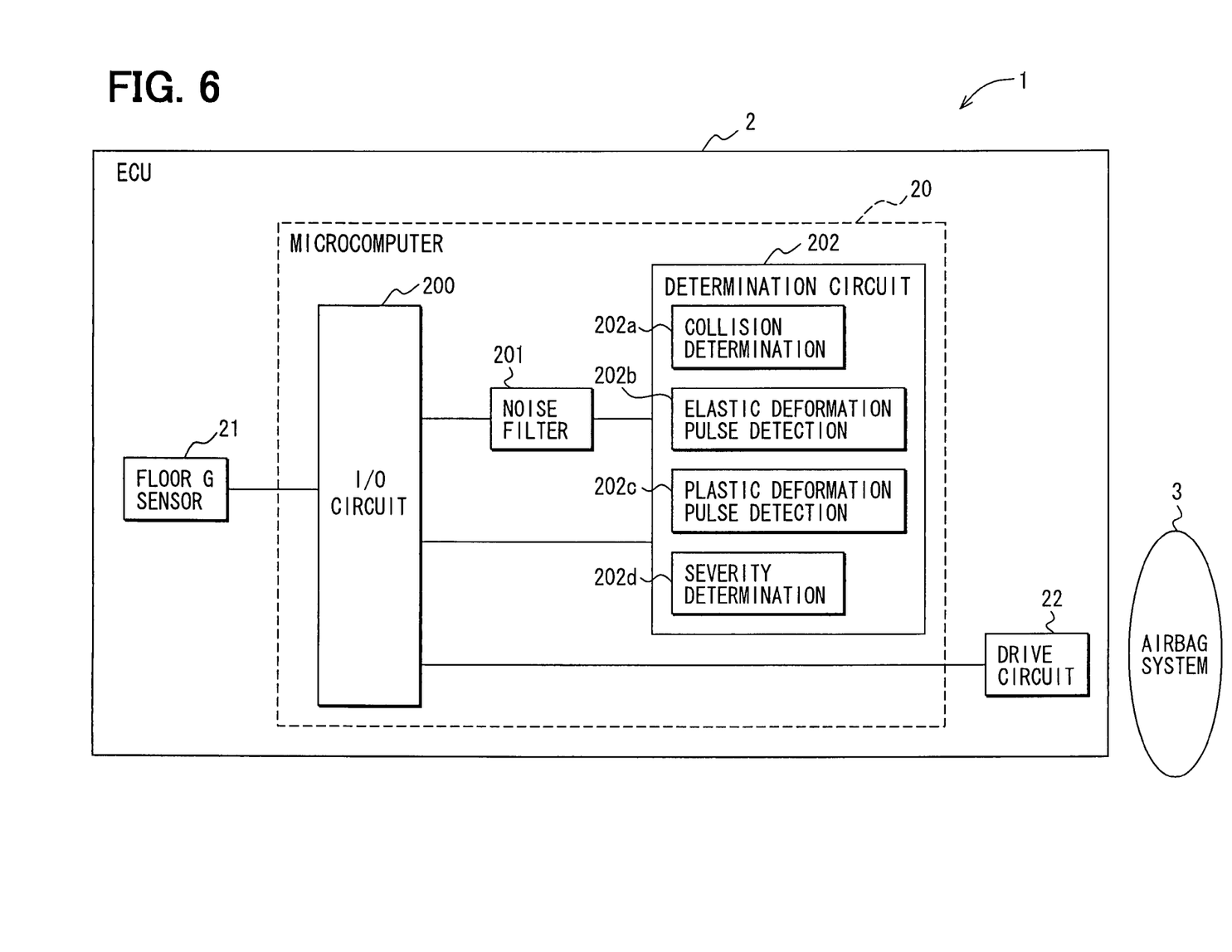
FIG. 6 is a block diagram of the passive safety system according to the first embodiment.

Referring to FIGS. 5 and 6, a passive safety system 1 including an electronic control unit (ECU) 2 and airbag systems 3 is installed in a vehicle 9. The ECU 2 is fixedly arranged below an instrument panel 92 and above a floor tunnel (not shown) in about the middle of a side-to-side line of the vehicle 9. It includes a microcomputer 20 and a floor G sensor 21. The floor G sensor 21 is an acceleration sensor and forms a determination device together with the microcomputer 20. The microcomputer 20 has an I/O circuit 200, a noise filter 201, and a determination circuit 202. The determination circuit 202 has a collision determination circuit 202a, an elastic deformation pulse detection circuit 202b, a plastic deformation pulse detection circuit 202c, and a severity determination circuit 202d.

One of the airbag systems 3 is disposed in the center of the steering wheel 93 and inside the steering wheel 93 and another airbag system 3 is disposed inside the instrument panel 92 on the passenger's side. Each airbag system 3 includes two inflators (not shown) and an airbag (not shown). The airbag system 3 inflates the airbag to two different levels depend on the severity of collision.

Figure 7:
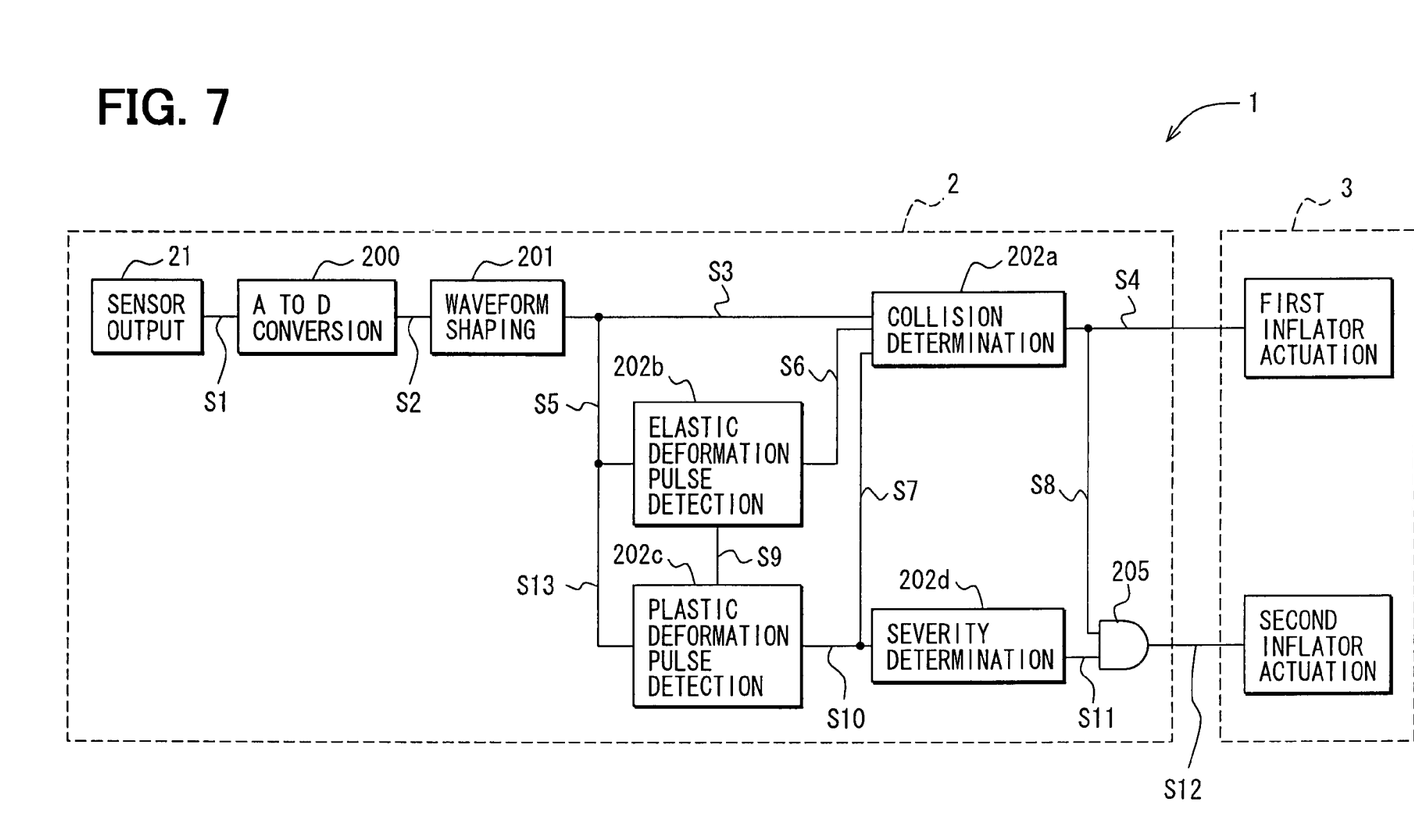
FIG. 7 is a flowchart of operation performed by the passive safety system and indicated with a block diagram of an ECU and an airbag system included in the passive safety system according to the first embodiment.

Operation of the passive safety system will be discussed referring to FIG. 7. Data outputted by the floor G sensor 21, which contains an acceleration waveform, is transmitted to the I/O circuit 200 via a signal line S1 and the acceleration waveform is converted into a digital form by the I/O circuit. The digital data containing the digital form of the acceleration waveform is transmitted to the noise filter 201 via a signal line S2. The acceleration waveform contained in the digital data is shaped by the noise filter 201. The shaped acceleration waveform is transmitted to the collision determination circuit 202a via a signal line S3. The shaped acceleration waveform contains an elastic deformation pulse and a plastic deformation pulse.

The shaped acceleration waveform is also transmitted to the elastic deformation pulse detection circuit 202b via a signal line S5. The elastic deformation pulse detection circuit 202b includes a low pass filter (not shown) with a cut off frequency of 6 to 7 Hz. A frequency of the elastic deformation pulse is lower than that of the plastic deformation pulse. Therefore, the elastic deformation pulse detection circuit 202b uses the low pass filter for separating the elastic deformation pulse from the shaped acceleration waveform. Then, it transmits the elastic deformation pulse to the plastic deformation pulse detection circuit 202c via a signal line S9. The elastic deformation pulse is also transmitted to the collision determination circuit 202a via a signal line S6.

The shaped acceleration waveform is also transmitted to the plastic deformation pulse detection circuit 202c via a signal line S13. An elastic deformation pulse component that corresponds to the elastic deformation pulse inputted from the elastic deformation pulse detection circuit 202b is removed from the shaped acceleration waveform. As a result, a plastic deformation pulse is detected. The detected plastic deformation pulse is transmitted to the collision determination circuit 202a via a signal line S7. The detected plastic deformation pulse is also transmitted to the severity determination circuit 202d via a signal line S10.

Figure 8A:
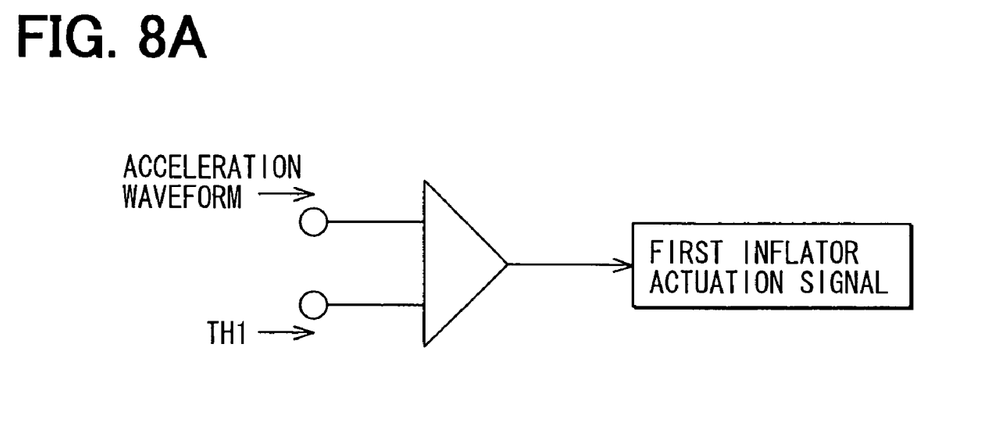
FIG. 8A is a schematic diagram showing operation of a comparator in a collision determination section of a determination circuit included in the passive safety system according to the first embodiment.
Figure 8B:
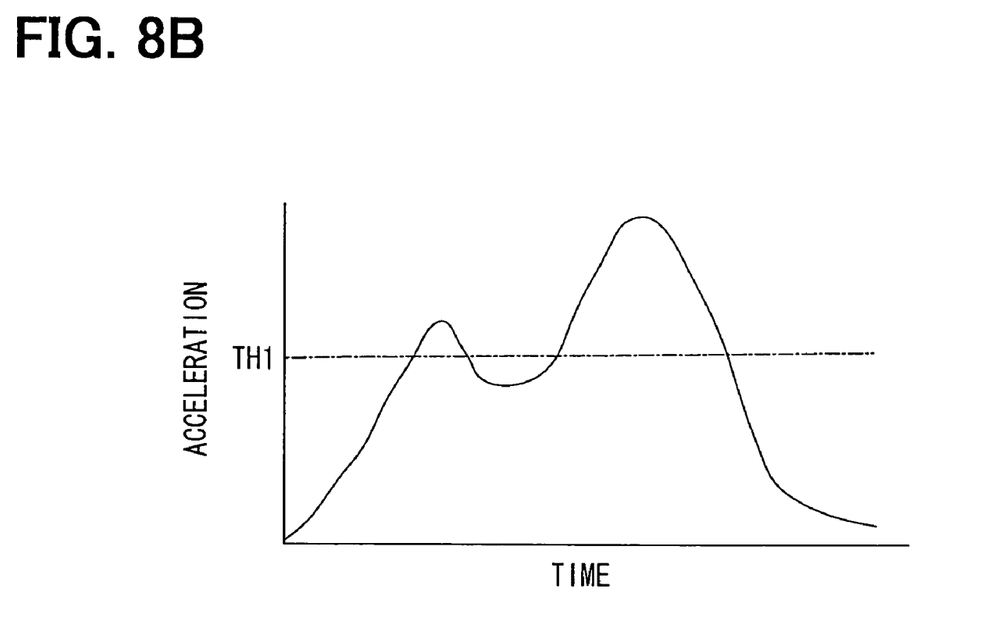
FIG. 8B is a graph showing the acceleration waveform and a threshold used for collision determination according to the first embodiment.

The collision determination circuit 202a has a comparator shown in FIG. 8A. The shaped acceleration waveform is corrected with the elastic deformation pulse and the plastic deformation pulse. The corrected acceleration waveform is inputted to the comparator via one of input terminals. A collision determination threshold TH1 used for determining whether actuation of the airbag system 3 is necessary is inputted to the other input terminal. The threshold TH1 is stored in a ROM (not shown) in advance. The comparator compares the corrected acceleration waveform with the threshold TH1. If a part of the corrected acceleration waveform exceeds the threshold TH1 as shown in FIG. 8B, the collision determination circuit 202a transmits a signal that requests for actuation of the first inflator (first inflator actuation signal) to the airbag system 3 via a signal line S4. The first inflator actuation signal is also transmitted to an AND gate 205 via a signal line S8.

Figure 9A:
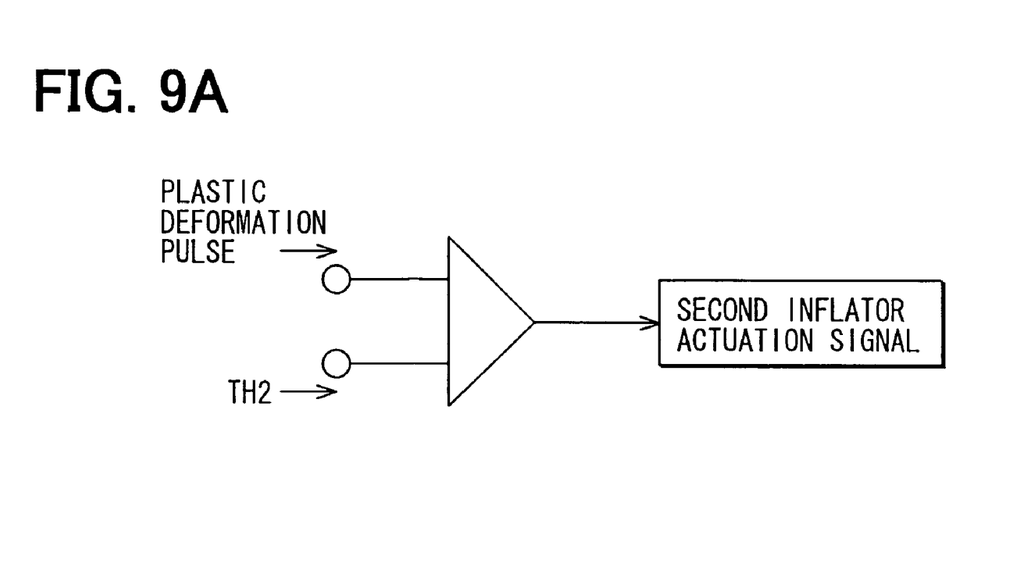
FIG. 9A is a schematic diagram showing operation of a comparator in the severity determination section of the determination circuit according to the first embodiment.
Figure 9B:
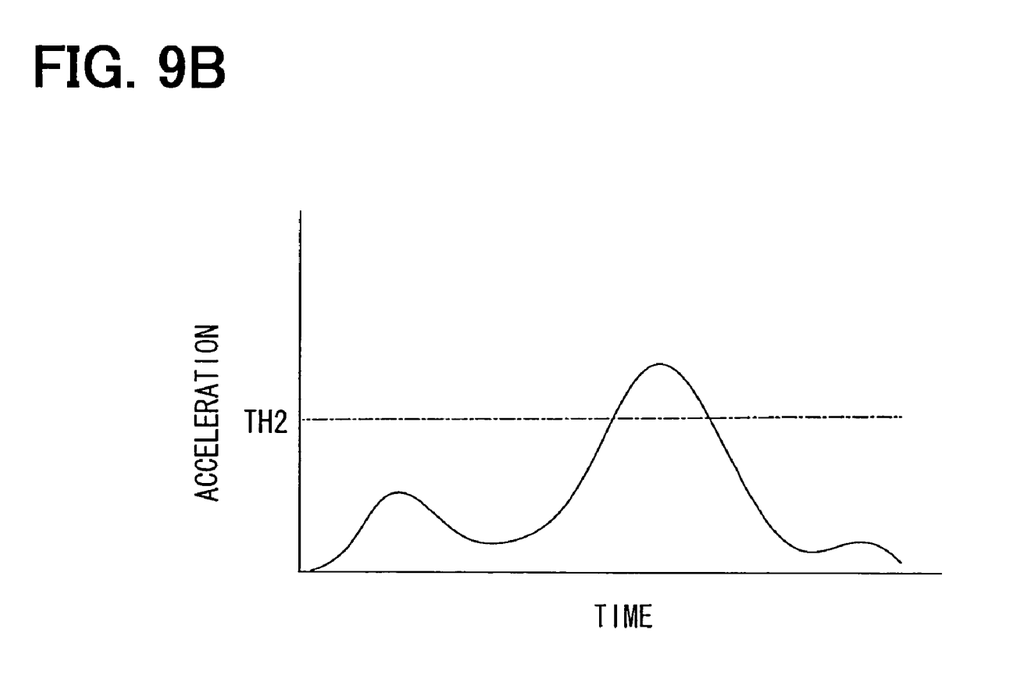
FIG. 9B is a graph showing the acceleration waveform and a threshold used for severity determination according to the first embodiment.

The severity determination circuit 202d has a comparator shown in FIG. 9A. The plastic deformation pulse is inputted to the comparator via one of input terminals. A severity determination threshold TH2 used for determining whether actuation of the second inflator is necessary is inputted to the other input terminal. The threshold TH2 is stored in a ROM (not shown) in advance. The comparator compares the plastic deformation pulse with the threshold TH2. If a part of the plastic deformation pulse exceeds the threshold TH2 as shown in FIG. 9B, the severity determination circuit 202d transmits a signal that requests actuation of the second inflator (second inflator actuation signal) to the AND gate 205 via a signal line S11. The AND gate 205 transmits a signal for actuating the second inflator to the airbag system 3 when it receives both the first inflator actuation signal and the second inflator actuation signal via a signal line S12.

In the passive safety system 1 determines the severity of collision based on the plastic deformation pulse that is obtained from an output of the floor G sensor 21. Namely, no additional sensor is required for the severity determination and therefore results of the severity determination are reliable. Moreover, the shaped acceleration waveform, the elastic deformation pulse, and the plastic deformation pulse are inputted to the collision determination circuit 202a. Thus, the collision determination is accurately performed.

The plastic deformation pulse detection circuit 202c removes the elastic deformation pulse component from the elastic deformation pulse detection circuit 202b from the shaped acceleration waveform. As a result, the plastic deformation pulse is detected based on an output of a single sensor and therefore any additional filters or plastic deformation pulse detecting devices are not required.

The floor G sensor 21 and the determination circuit 202 are modularized and disposed in the ECU 2. Thus, they do not take much mounting space in comparison with a device in which an acceleration sensor and a determination circuit are distantly arranged. Furthermore, the floor G sensor 21 and the determination circuit 202 can be shared among other models of vehicles.

The floor G sensor 21 is less likely to be damaged in the event of an accident since the ECU 2 is fixedly arranged below the instrument panel 92 and above the floor tunnel. Therefore, the severity determination is properly performed regardless of a degree of impact of the collision.

An actuation signal that requests actuation of the first inflator is transmitted to the AND gate 205 via the signal line S8. Thus, the second inflator will not be actuated before the actuation of the first inflator.

Second Embodiment

Figure 10:
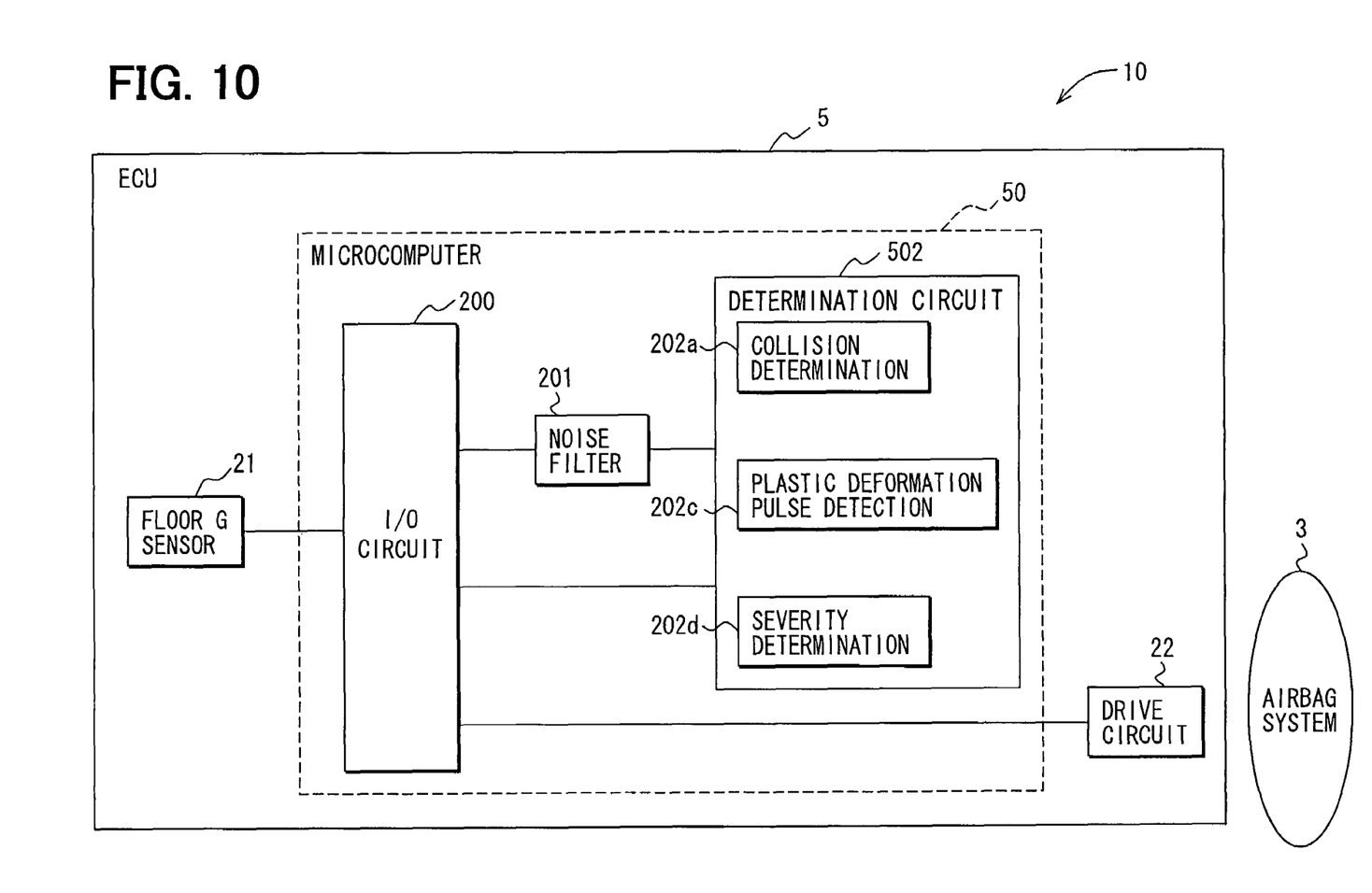
FIG. 10 is a block diagram of a passive safety system according to the second embodiment of the present invention.

Referring to FIG. 10, a passive safety system 10 includes an ECU 5 and the airbag system 3. The ECU 5 includes a microcomputer 500 having a determination circuit 502. Other devices in the microcomputer 500, the ECU 5, and the passive safety system 10 are the same as those of the passive safety system 1 of the first embodiment. Therefore, detailed description only regarding the determination circuit 502 will be discussed. The determination circuit 502 includes the collision determination circuit 202a, the plastic deformation pulse detection circuit 202c, and the severity determination circuit 202d. However, it does not include the elastic deformation pulse detection circuit 202b.

Figure 11:
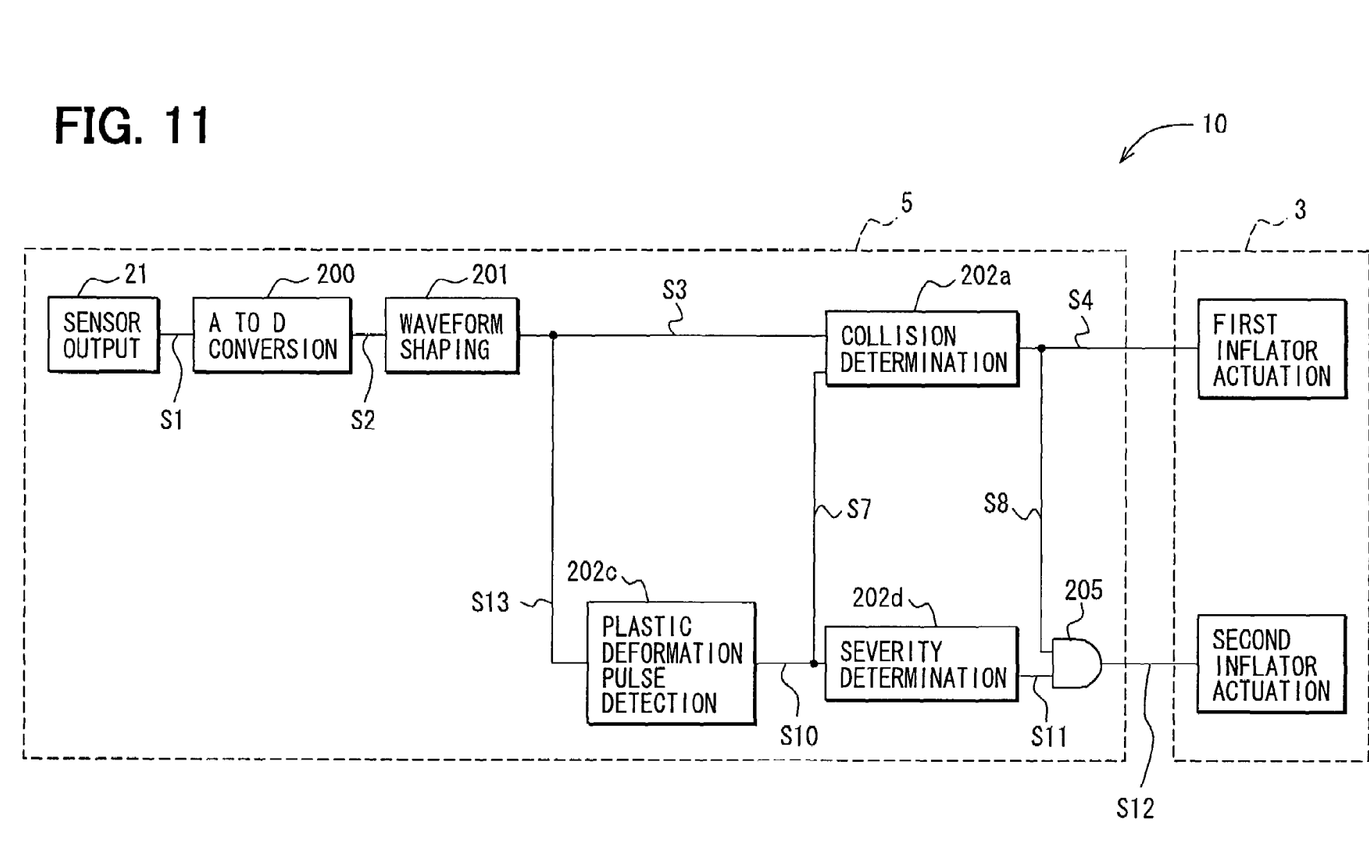
FIG. 11 is a flowchart of operation performed by the passive safety system and indicated with a block diagram of an ECU and an airbag system included in the passive safety system according to the second embodiment.

Signals are transmitted in the passive safety system 10 as shown in FIG. 11 when collision occurs. An acceleration waveform shaped by the noise filter 201 is inputted to the plastic deformation pulse detection circuit 202c via the signal line S13. The plastic deformation pulse detection circuit 202c has a high pass filter (not shown) with a cut off frequency of 60 to 70 Hz. A plastic deformation pulse is detected by filtering the acceleration waveform with the high pass filter because a frequency of the plastic deformation pulse is higher than that of the elastic deformation pulse. The detected plastic deformation pulse is transmitted to the severity determination circuit 202d via the signal line S10.

Figure 12A:
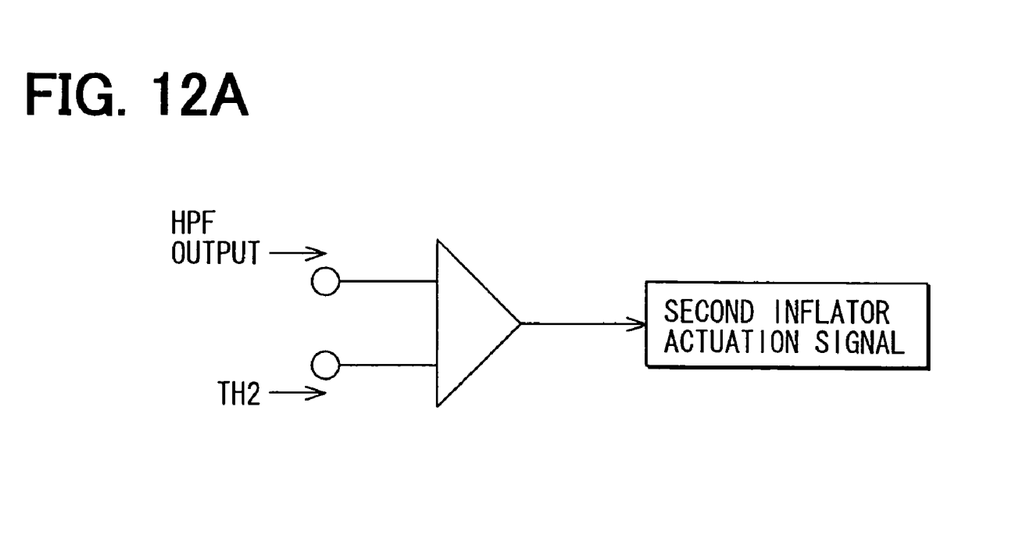
FIG. 12A is a schematic diagram showing operation of a comparator in the severity determination section of the determination circuit according to the second embodiment.
Figure 12B:
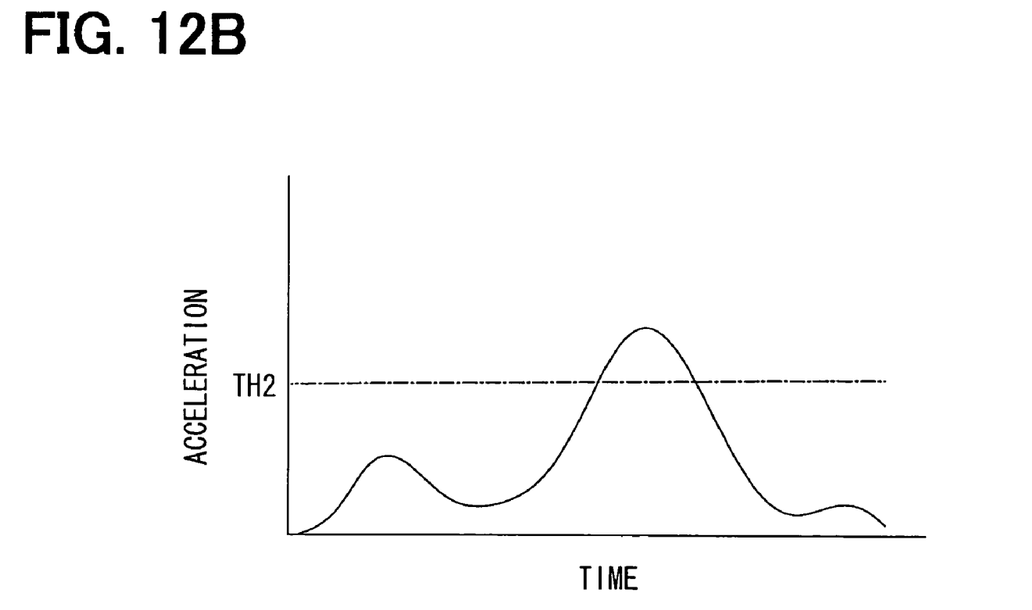
FIG. 12B is a graph showing the acceleration waveform and a threshold used for severity determination according to the second embodiment.

The plastic deformation pulse detected by the high pass filter (HPF) and the severity threshold TH2 are inputted to the comparator of the severity determination circuit 202d as shown in FIG. 12A. The comparator compares the plastic deformation pulse with the severity threshold TH2. If a part of the plastic deformation pulse exceeds the severity threshold TH2 as shown in FIG. 12B, actuation signal that requests actuation of the second inflator is inputted to the AND gate 205 via the signal line S11. The plastic deformation pulse is also transmitted to the collision determination circuit 202a via the signal line S7.

The passive safety system 10 provides the same effects as the passive safety system 1 of the first embodiment. However, the configuration of the passive safety system 10 is simpler than that of the passive safety system 1 of the first embodiment because it does not have the elastic deformation pulse detection circuit 202b.

The present invention should not be limited to the embodiment previously discussed and shown in the figures, but may be implemented in various ways without departing from the spirit of the invention. For example, the ECU 2, 5 can be used for a seatbelt pretensioner system for tightening a seatbelt according to the severity of collision in the event of an accident.

The passive safety system 1, 10 or the ECU 2, 5 may be separately used with an existing passive safety system. Specifically, a collision is determined based on acceleration waveforms outputted from a satellite sensor 91 arranged the front or the sides of the vehicle 9 as shown in FIG. 5 and from the floor G sensor 21. Then, the severity of the collision is determined based on the acceleration waveform outputted from the floor G sensor 21. The cut off frequency of the low pass filter or the high pass filter can be set to any frequency; for example, it can be set to a frequency between 5 Hz and 10 Hz. Any technique to obtain the similar results produced by the low-pass filter or the high-pass filter, such an interval integration and interval differentiation, can be used.

What is claimed is:

1. A passive safety system comprising:
    a single acceleration sensor that measures an acceleration of a vehicle;
    a determination device that includes a determination circuit having a plastic deformation pulse detection section and a severity determination section;
    a passive safety device that protects an occupant from injury in a vehicle accident; and
    an elastic deformation pulse detection section that detects an elastic deformation pulse by separating the elastic deformation pulse from an acceleration waveform produced by the acceleration sensor, the acceleration waveform produced by the acceleration sensor containing an elastic deformation pulse and a plastic deformation pulse having a high frequency higher than a frequency of the elastic deformation pulse, wherein
    the determination device and the passive safety device are electrically connected with the acceleration sensor and the determination device, respectively,
    the plastic deformation pulse detection section detects a plastic deformation pulse by separating the plastic deformation pulse from the acceleration waveform produced by the acceleration sensor,
    the severity determination section determines the severity of a collision based on the plastic deformation pulse detected by the plastic deformation pulse section,
    the passive safety device operates according to the severity,
    the elastic deformation pulse detection section includes a low pass filter,
    the elastic deformation pulse detection section separates the elastic deformation pulse by filtering the acceleration waveform with the low pass filter,
    the passive safety device is an airbag system having multiple inflators and one airbag that is inflated by the multiple inflators for reducing an impact of a collision on the occupant, the number of the multiple inflators to be actuated for the one airbag being determined based on the determined severity; and
    the determination device determines actuation of each inflator based on the severity, wherein
    a first inflator of the multiple inflators is actuated and then a second inflator of the multiple inflators is actuated when a predetermined period has elapsed, when the determined severity is low,
    the first inflator and the second inflator are simultaneously actuated to inflate the airbag when the determined severity is high,
    an actuation signal that actuates the first inflator is further transmitted to the second inflator by routing through an AND gate, whereby the second inflator will not be actuated before the actuation of the first inflator.

2. The passive safety system according to claim 1, wherein the plastic deformation pulse detection section includes a high pass filter; and
    the plastic deformation pulse detection section separates the plastic deformation pulse by filtering the acceleration waveform with the high pass filter.

3. The passive safety system of claim 1,
    wherein the plastic deformation pulse detection section further detects the plastic deformation pulse by removing an elastic deformation pulse component corresponding to the elastic deformation pulse detected by the elastic deformation pulse detecting section from the acceleration waveform.

4. The passive safety system according to claim 1, further includes an electronic control unit for controlling operation of the passive safety device, wherein the acceleration sensor and the determination device are modularized and arranged inside the electronic control unit.

5. The passive safety system according to claim 4, wherein the electronic control unit is arranged in about a middle of a side-to-side line of the vehicle.

6. The passive safety system according to claim 1, the plastic deformation pulse being caused by damage of individual parts of the vehicle.

7. The passive safety system according to claim 1,
    the elastic deformation pulse detection section receiving the acceleration waveform from the single acceleration sensor, and outputting the elastic deformation pulse separated from the acceleration waveform;
    the plastic deformation pulse detection section receiving the acceleration waveform from the single acceleration sensor, and the separated elastic deformation pulse from the elastic deformation pulse detection section; and being configured to remove, from the acceleration waveform, an elastic deformation pulse component that corresponds to the elastic deformation pulse received from the elastic deformation pulse detection section so as to separate out the plastic deformation pulse; and outputting, to the severity determination section, the plastic deformation pulse separated from the acceleration waveform;
    the determination circuit receiving the acceleration waveform from the single acceleration sensor.

8. The passive safety system according to claim 7,
    the determination circuit receiving: the acceleration waveform from the single acceleration sensor, the elastic deformation pulse from the elastic deformation pulse detection section, and the plastic deformation pulse from the plastic deformation pulse detection section; the determination circuit being configured to correct the acceleration waveform with the received elastic deformation pulse and the received plastic deformation pulse, and to compare the corrected acceleration waveform to a collision determination threshold.

9. The passive safety system according to claim 1,
    the severity determination section receives, from the plastic deformation pulse detection section, the plastic deformation pulse separated from the acceleration waveform, and is configured to determine the severity on which the actuation of each inflator is based by comparing the received plastic deformation pulse to a severity threshold.

10. A passive safety system comprising:
    a single acceleration sensor that measures an acceleration of a vehicle;
    a determination device that includes a determination circuit having a plastic deformation pulse detection section and a severity determination section;
    a passive safety device that protects an occupant from injury in a vehicle accident; and
    an elastic deformation pulse detection section that detects an elastic deformation pulse by separating the elastic deformation pulse from an acceleration waveform produced by the acceleration sensor, the acceleration waveform produced by the acceleration sensor containing an elastic deformation pulse and a plastic deformation pulse having a high frequency higher than a frequency of the elastic deformation pulse, wherein the determination device and the passive safety device are electrically connected with the acceleration sensor and the determination device, respectively, the plastic deformation pulse detection section detects a plastic deformation pulse by separating the plastic deformation pulse from the acceleration waveform produced by the acceleration sensor, the severity determination section determines the severity of a collision based on the plastic deformation pulse detected by the plastic deformation pulse section, the passive safety device operates according to the severity, the elastic deformation pulse detection section includes a low pass filter, the elastic deformation pulse detection section separates the elastic deformation pulse by filtering the acceleration waveform with the low sass filter, the passive safety device is an airbags system having multiple inflators and one airbag that is inflated by the multiple inflators for reducing an impact of a collision on the occupant, the number of the multiple inflators to be actuated for the one airbag being determined based on die determined severity; and the determination device determines actuation of each inflator based on the severity, the elastic deformation pulse detection section receiving the acceleration waveform from the single acceleration sensor, and outputting the elastic deformation pulse separated from the acceleration waveform;

the plastic deformation pulse detection section receiving the acceleration waveform from the single acceleration sensor, and the separated elastic deformation pulse from the elastic deformation pulse detection section; and being configured to remove, from the acceleration waveform, an elastic deformation pulse component that corresponds to the elastic deformation pulse received from the elastic deformation pulse detection section so as to separate out the plastic deformation pulse; and outputting, to the severity determination section, the plastic deformation pulse separated from the acceleration waveform;

the determination circuit receiving the acceleration waveform from the single acceleration sensor, the multiple inflators including a first inflator and a second inflator;

the determination circuit being configured to determine when the acceleration waveform reaches a collision determination threshold so that actuation of the first inflator is necessary, the determination circuit outputting a first actuation request signal to an AND gate and to the first inflator when the collision threshold is reached;

the severity determination section inputting the plastic deformation pulse from the plastic deformation pulse detection section, and being configured to determine when the plastic deformation pulse reaches a severity threshold so that actuation of the second inflator is necessary, the severity determination section outputting a second actuation request signal to the AND gate when the severity threshold is reached; and the AND gate being configured to receive the first actuation request signal and the second actuation request signal, and to transmit a signal to actuate the second inflator when the AND gate receives both the first actuation request signal and the second actuation request signal.

11. A passive safety system comprising:

a single acceleration sensor that measures an acceleration of a vehicle;

a determination device that includes a determination circuit having a plastic deformation pulse detection section and a severity determination section;

a passive safety device that protects an occupant from injury in a vehicle accident; and an elastic deformation pulse detection section that detects an elastic deformation pulse by separating the elastic deformation pulse from an acceleration waveform produced by the acceleration sensor, the acceleration waveform produced by the acceleration sensor containing an elastic deformation pulse and a plastic deformation pulse having a high frequency higher than a frequency of the elastic deformation pulse, wherein the determination device and the passive safety device are electrically connected with the acceleration sensor and the determination device, respectively, the plastic deformation pulse detection section detects a plastic deformation pulse by separating the plastic deformation pulse from the acceleration waveform produced by the acceleration sensor, the severity determination section determines the severity of a collision based on the plastic deformation pulse detected by the plastic deformation pulse section, the passive safety device operates according to the severity, the elastic deformation pulse detection section includes a low pass filter, the elastic deformation pulse detection section separates the elastic deformation pulse by filtering the acceleration waveform with the low pass filter, the passive safety device is an airbag system having multiple inflators and one airbag that is inflated by the multiple inflators for reducing an impact of a collision on the occupant, the number of the multiple inflators to be actuated for the one airbag being determined based on the determined severity; and the determination device determines actuation of each inflator based on the severity, the multiple inflators including a first inflator and a second inflator;

the determination circuit inputting the acceleration waveform from the single acceleration sensor, and being configured to determine when the acceleration waveform reaches a collision determination threshold so that actuation of the first inflator is necessary, the determination circuit outputting a first actuation request signal to an AND gate and to the first inflator when the collision threshold is reached;

the severity determination section inputting the plastic deformation pulse from the plastic deformation pulse detection section, and being configured to determine when the plastic deformation pulse reaches a severity threshold so that actuation of the second inflator is necessary, the severity determination section outputting a second actuation request signal to the AND gate when the severity threshold is reached; and the AND gate being configured to receive the first actuation request signal and the second actuation request signal, and to transmit a signal to actuate the second inflator when the AND gate receives both the first actuation request signal and the second actuation request signal.

* * * * *